US007903563B2

(12) United States Patent
Schollmeier et al.

(10) Patent No.: US 7,903,563 B2
(45) Date of Patent: Mar. 8, 2011

(54) SHORTEST-PATH ROUTING OPTIMIZED FOR NETWORK UTILIZATION

(75) Inventors: Gero Schollmeier, Gauting (DE); Christian Winkler, München (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 1170 days.

(21) Appl. No.: 10/585,714

(22) PCT Filed: Jan. 10, 2005

(86) PCT No.: PCT/EP2005/050082
§ 371 (c)(1),
(2), (4) Date: Nov. 7, 2006

(87) PCT Pub. No.: WO2005/071899
PCT Pub. Date: Aug. 4, 2005

(65) Prior Publication Data
US 2009/0185491 A1    Jul. 23, 2009

(30) Foreign Application Priority Data

Jan. 23, 2004  (DE) .................. 10 2004 003 547

(51) Int. Cl.
*H04L 12/28* (2006.01)
(52) U.S. Cl. ......................... 370/238; 370/386
(58) Field of Classification Search ............... 370/238
See application file for complete search history.

(56) References Cited

U.S. PATENT DOCUMENTS

| 7,395,351 | B1* | 7/2008 | Nucci et al. .............. 709/242 |
| 2002/0141346 | A1* | 10/2002 | Garcia-Luna-Aceves et al. ........................ 370/238 |
| 2003/0081608 | A1* | 5/2003 | Barri et al. ................ 370/392 |
| 2003/0227924 | A1 | 12/2003 | Kodialam et al. |

FOREIGN PATENT DOCUMENTS

| EP | 0 753 979 A1 | 1/1997 |
| WO | WO 02/46947 A1 | 6/2002 |

OTHER PUBLICATIONS

J. Harmatos, "A Heuristic Algorithm for Solving the Static Weight Optimisation Problem in OSPF Networks", Institute of Electrical and Electronics Engineers, Globecom '01, 2001 IEEE Global Telecommunications Conference, San Antonio, TX, Nov. 25-29, 2001, IEEE Global Telecommunications Conference, New York, NY, IEEE, US, vol. 3 of 6, Nov. 25, 2001, pp. 1605-1609, XP001054849.

Curtis Villamizar, "OSPF Optimized Multipath (OSPF-OMP)", IETF Standard-Working-Draft, Internet Engineering Task Force, IETF, CH, vol. ospt, No. 2, Feb. 24, 1999, pp. 1-38, XP015024724.

* cited by examiner

*Primary Examiner* — Seema S Rao
*Assistant Examiner* — Wanda Z Russell
(74) *Attorney, Agent, or Firm* — Laurence A. Greenberg; Werner H. Stemer; Ralph E. Locher

(57) ABSTRACT

A method for shortest path routing, optimized for network utilization is provided. The shortest or optimal paths for routing within the network are calculated from initial values for the link costs. The paths comprise possible path alternatives. The number of originally calculated paths is reduced to the set of unique paths (no path alternative), by changing the link costs as a measure of the loading of the individual links, which leads to an optimized loading of the links, in other words an optimized network utilization. The method provides a simple determination of paths for a single shortest path routing, optimized for network utilization.

11 Claims, 1 Drawing Sheet

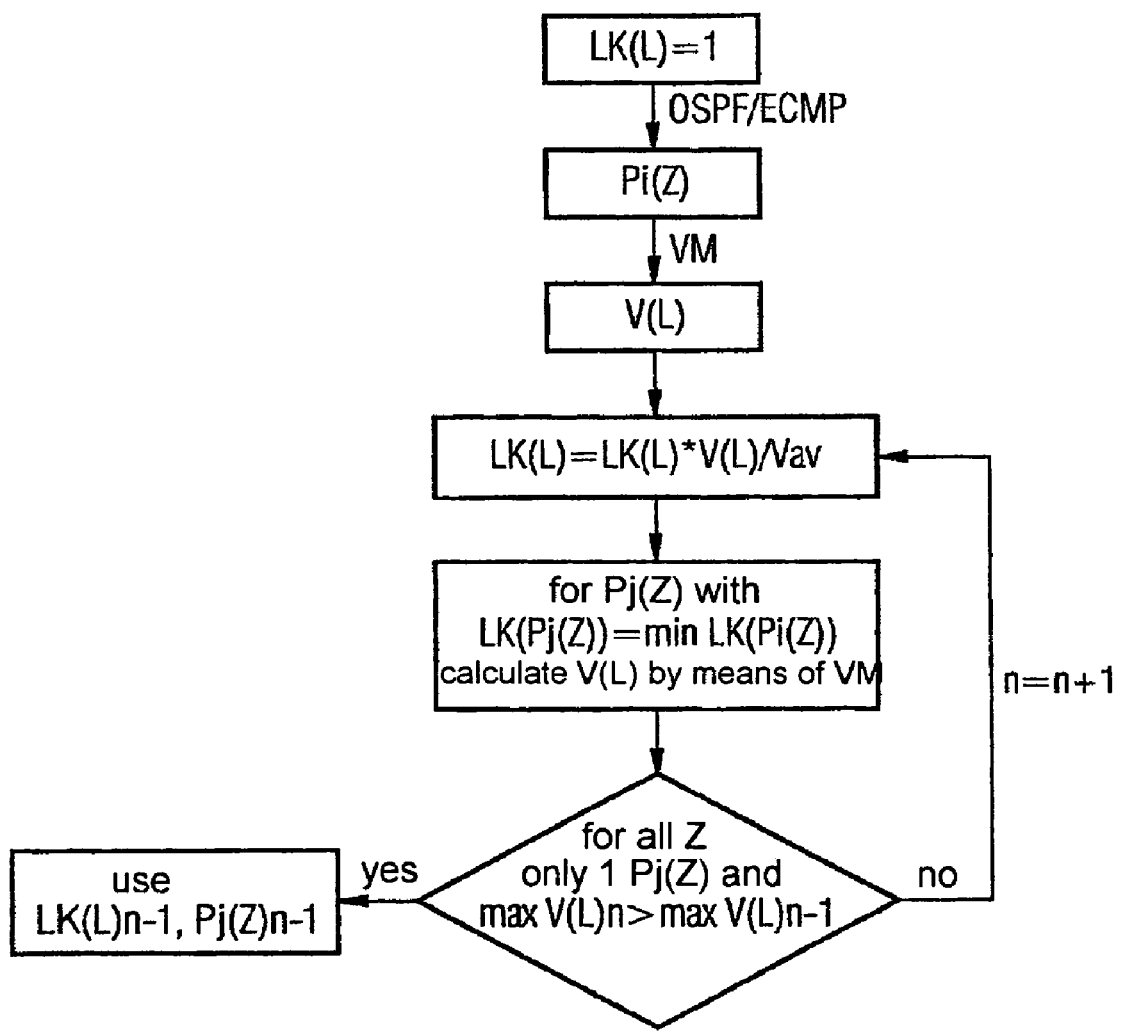

SHORTEST-PATH ROUTING OPTIMIZED FOR NETWORK UTILIZATION

CROSS REFERENCE TO RELATED APPLICATIONS

This application is the US National Stage of International Application No. PCT/EP2005/050082, filed Jan. 10, 2005 and claims the benefit thereof. The International Application claims the benefits of German application No. 102004003547.4 DE filed Jan. 23, 2004, both of the applications are incorporated by reference herein in their entirety.

FIELD OF INVENTION

The invention relates to a method for determining paths in a communication network formed by links for the optimized shortest-path routing with respect to the network loading and the traffic volume expected for the communication network. The invention relates to the field of communication networks and, in particular, the aspect of packet-based networks.

BACKGROUND OF INVENTION

In data networks or packet-based networks, such as IP (Internet Protocol) based Internet, so-called single shortest-path routing methods are at present the ones most used. With these methods, e.g. OSPF (Open Shortest Path First) and IS-IS (Intermediate System—Intermediate System), link costs are allocated to the links of a network formed by links. This is also referred to as a metric. With this metric, the least expensive or shortest path between two points or nodes is determined. This shortest path is the path with the least accumulated link costs for the links constituting the path. As a very conservative choice, the link cost for each link is regarded as the same (e.g. equal to one). Thus, the shortest path is the path with the lowest number of hops or links.

It is desirable to load all the links in a network equally if possible. An even loading in the network maximizes the tolerance of dynamic load changes, that can occur due both to additional traffic volume and to the failure of links. Methods are known whereby, with a high programming and computing cost, costs are allocated to the links in the network such that optimum routing is achieved with respect to the traffic distribution. These methods are, however, usually so expensive that a distributed implementation in all routers of the network cannot be justified. At present, therefore, non-optimum link costs are mainly used, e.g. the same costs for all links or nodes that are in reverse proportion to the bandwidth of the link. Unavoidable adjustments of link costs are frequently carried out manually, thus carrying a high risk of error. Therefore, a sub-optimum traffic distribution is usually accepted in practical networks.

SUMMARY OF INVENTION

An object of the invention is to provide a simple method for determining paths for an optimized shortest-path routing.

This objective is achieved by the independent claim.

With the method in accordance with the invention, the shortest-path routing optimized with respect to the network loading is determined. Shortest-path routing means that shortest paths are determined with reference to a metric. An anticipated traffic volume is used as a basis to enable the network loading to be quantified. This traffic volume is, for example, mathematically expressed by means of a traffic matrix, i.e. a matrix that provides a transported traffic volume for a source and destination. The entries in the traffic matrix can be determined on the basis of empirical or measured values. With a method in accordance with the invention, the following steps are performed:

a) Initial values for the link costs are allocated to the links of the communication network. These initial values are, for example, all equal and have a numerical value, e.g. 1.

b) On the basis of these link costs or by means of the matrix provided by them, optimum paths for routing in the communication network are calculated. With this calculation it is useful to take account as far as possible of all optimum paths, i.e. including alternative paths, and use them for the ongoing process. A calculation of this kind can, for example, be performed in each router for the possible destinations by means of a protocol such as OSPF or IS-IS. To take account of alternative paths, the ECMP (Equal Cost Multi Path) concept defined by the OSPF protocol, that provides for the use of equivalent path alternatives, can be used.

c) For the calculated optimum paths, the expected traffic volume can be used to determine a parameter, relative to the link utilization or link traffic load, for the individual links of the communication network. This parameter is, for example, provided for by the absolute traffic load of the individual links, the traffic load relative to the bandwidth, traffic-related costs occurring for the link utilization, the link availability, the run time of the particular link or the load capacity of the final node of the relevant link.

d) With this parameter determined for the individual links, the link costs of the individual links are changed, so that a first link that has a higher parameter compared to a second link experiences an increase in link costs relative to this second link. This change thus continues so that higher loaded links become "more expensive", i.e. have higher link costs and consequently are less preferred in the sense of a shortest-path routing. The increase in the link costs can, for example, be carried out in that the link costs are multiplied by a factor that represents a measure of the relative size of the parameter for this special link compared with the average value of the parameter.

e) Using these new link costs, changed according to the parameters, the originally calculated paths that according to the changed link costs are still optimum are determined. Based on the expected traffic volume, the parameter, relative to the link utilization, for the links of the communication network, is determined from this optimum subset of paths.

f) The changing of the link costs and the determination of the parameter relative to the link utilization on the basis of the subset of optimum paths is run through or repeated until a termination criterion is fulfilled. This termination criterion is, for example, present if the maximum link-related value of this parameter is greater than during the preceding run. The path that belonged to the subset of optimum paths during the preceding run can then be used for routing within the network. For single shortest-path routing it is appropriate to additionally require, as a termination criterion, that the subset of optimum paths does not contain any path alternatives. It is possible to impose this property of the subset of paths by changing any traffic matrix that describes the expected traffic volume, to interrupt possible symmetries in the paths.

g) A subset of optimum paths that was identified in step e) is then used for routing in the communication network. Depending on the termination criteria, it is useful, for example, to use the subset in the last or last but one step.

The method in accordance with the invention requires little expense. The calculation of paths takes place only in step b). From these paths, the optimum paths for a balanced traffic distribution are determined in accordance with the method. For a single shortest-path routing, the method can be regarded as such that from a set of optimum paths that contain all possible alternative paths, the paths are found that lead to an optimized traffic distribution, with path alternatives not being permitted. The method then leads, so to speak, from a multi-path routing determined using ECMP, for example, to a single path routing optimized from the point of view of traffic distribution.

BRIEF DESCRIPTION OF THE DRAWING

The method in accordance with the invention is explained in more detail in the following with the aid of a FIGURE.

The FIGURE shows a flow diagram of the steps taken by the method.

DETAILED DESCRIPTION OF INVENTION

The link costs LK (L) of the link L of a network are initialized with the value 1. In the next step, with the aid of the ECMP method defined by means of the OSPF protocol, the set of all the optimum paths Pi(z), as indicated by the metric, provided by the link costs LK=1 is calculated. With the OSPF protocol, this calculation normally takes place in each node. In doing so, the optimum path (Pi(z) for each path to a destination Z is determined for each node, and the links for the forwarding of data packets to this destination Z are accordingly specified. By means of the traffic matrix VM, the traffic V (L) transported on the paths Pi(z) is calculated for all links. (In the exemplary embodiment, the parameter relevant to the link utilization is given by the traffic on the particular link). The link costs LK (L) are then changed in accordance with the following formula.

$$LK(L) = \frac{LK(L) \times V(L)}{Vav}$$

with Vav being the average traffic loading on the links. In the next step, the subset of the paths Pj(z) that are still minimum measured against the changed link costs, is considered. This means that the link costs LK(Pj(z)) of these paths Pj(z) are minimum with respect to the paths from a node to the same destination Z. The traffic loading V(L) of the individual links is calculated for routing via this subset of paths Pj(z) using the traffic matrix VM. The change in the link costs, the determination of the subset of minimum paths Pj(z) and the calculation of the traffic loading of the individual links V(L) is repeated until the following termination criterion is fulfilled, i.e. there are no further path alternatives, which means that from each node to each destination Z there is still, as indicated by the metric, only one optimum path Pj(z) in the last but one step and the maximum of the traffic load V(L) over all the links is greater in the present step than the maximum for the preceding step. The paths Pj(z) from the last but one step and the link costs LK(L) n-1 in the last but one step are now used for a single shortest-path routing optimized with respect to traffic distribution.

The invention claimed is:

1. A method for determining paths in a communication network having links for an optimized shortest-path routing relative to the network loading and having a traffic volume expected for the communication network, comprising:
    initializing a link cost for each of the links;
    calculating optimum paths for the routing in the communication network relative to the link costs;
    determining a parameter for each the links based on the link traffic load of the communication network for routing the expected traffic volume through the calculated optimum paths;
    changing the link costs based on the determined parameters such that a link cost of a first link is increased relative to a link cost of a second link when a determined parameter of the first link is greater than a determined parameter of the second link, in accordance to the formula:

$$\text{link cost} = \frac{(\text{link cost}) \times (\text{parameter})}{\text{average loading of the link}};$$

re-determining the parameters for the routing of the expected traffic volume via the subset of paths of the calculated paths that are optimized with respect to the changed link costs;
    repeating the changing and the re-determining steps until achieving a termination criterion; and
    using the subset of paths in a last step of re-determining for the routing in the communication network.

2. The method in accordance with claim 1, wherein all paths for the routing in the communication network that are optimum relative to the initial values for the link costs are calculated.

3. The method in accordance with claim 1, wherein the parameter for each link is based on item selected from the group consisting of an absolute traffic load, a traffic load relative to the link bandwidth, traffic-related costs occurring during the use of the link, an availability of the link, a run time of the link, and a load capacity of final nodes of the link.

4. The method in accordance with claim 1, wherein the links are initialized to the same link cost.

5. The method in accordance with claim 1, wherein the paths are calculated via an equal cost multi path (ECMP) method.

6. The method in accordance with claim 1,
    wherein a maximum of the parameters is determined during the re-determining step; and wherein the termination criterion is achieved when the maximum of the parameters is greater than the maximum of the parameters during the preceding changing and re-determining steps.

7. The method in accordance with claim 6, wherein the subset of paths for the preceding changing and re-determining steps is used for routing in the communication network.

8. The method in accordance with claim 1,
    wherein a maximum of the parameters is determined during the re-determining step; and
    wherein the termination criterion is achieved:
        when the maximum of the parameters is greater than the maximum of the parameters during the preceding changing and re-determining steps, and
        when a determination is made that during the preceding changing and re-determining steps the subset of paths contains no alternative paths.

9. The method in accordance with claim 8, further comprising changing a traffic matrix via random values in relation to entries in a random matrix, so that the subset of paths contains no alternative paths, wherein the expected traffic volume is based on the traffic matrix.

10. The method in accordance with claim 8, wherein the subset of paths for the preceding changing and re-determining steps is used for routing in the communication network.

11. The method in accordance with claim 1, wherein the expected traffic volume is based on a traffic matrix.

* * * * *